United States Patent [19]

Nakashima

[11] Patent Number: 5,247,043
[45] Date of Patent: Sep. 21, 1993

[54] PHENYLPOLYSILSESQUIOXANES AND METHOD FOR THEIR PREPARATION

[75] Inventor: Hisataka Nakashima, Chiba, Japan

[73] Assignee: Dow Corning Toray Silicone Co., Ltd., Tokyo, Japan

[21] Appl. No.: 920,614

[22] Filed: Jul. 24, 1992

[30] Foreign Application Priority Data

Aug. 6, 1991 [JP] Japan .................. 3-221052

[51] Int. Cl.$^5$ .............................. C08G 77/06
[52] U.S. Cl. ........................ 528/14; 528/43; 556/450; 556/459; 556/466
[58] Field of Search ............. 528/14, 43; 556/450, 556/459, 466

[56] References Cited

U.S. PATENT DOCUMENTS 3,378,575  4/1968  Brown ........................ 260/448.2
5,081,202  1/1992  Adachi et al. .................. 528/43

FOREIGN PATENT DOCUMENTS 10627    1/1982   Japan .
59222    4/1983   Japan .
50657   11/1983   Japan .
108033   6/1984   Japan .
127732   6/1986   Japan .
3-36934  1/1992   Japan .

OTHER PUBLICATIONS

Vopr. Khim. Khim. Tekhnol; vol. 81; 1986, pp. 79-90 Etherification of Trichlorophenylsilane with Propyl and Butyl Alcohols.

Primary Examiner—Melvyn I. Marquis
Attorney, Agent, or Firm—Robert L. McKellar

[57] ABSTRACT

Low-molecular-weight phenylpolysilsesquioxanes that have narrow molecular weight distribution and a method for the preparation of the same.

1 Claim, 1 Drawing Sheet

PHENYLPOLYSILSESQUIOXANES AND METHOD FOR THEIR PREPARATION

THE INVENTION

The present invention relates to phenylpolysilsesquioxanes and to a method for the preparation of the same. More specifically, the present invention relates to low-molecular-weight phenylpolysilsesquioxanes with a narrow molecular weight distribution (low dispersity) and to a method for the preparation of same.

THE PRIOR ART

Phenylpolysilsesquioxanes have high thermal decomposition temperatures and as a consequence are employed as heat-resistant materials. For example, phenylpolysilsesquioxanes are used for heat-resistant paints and coatings, as a protective film for semiconductors, and as laminar dielectric films. Certain methods for the preparation of phenylpolysilsesquioxane are known from Japanese Patent Publication Number 58-50657, Japanese Patent Application Laid Open Number 58-59222, and Japanese Patent Application Laid Open Number 59-108033.

However, in all cases, the phenylpolysilsesquioxanes afforded by these prior preparative methods have a high molecular weight that is number-average molecular weights, generally within the range of 1,000 to 500,000 and a broad molecular weight distribution.

As a consequence, the preparation of phenylpolysilsesquioxane with a narrow molecular weight distribution by the prior preparative methods requires that the initial phenylpolysilsesquioxane product be subjected to a molecular weight-based separation (refer to Japanese Patent Application Laid Open Number 57-10627 and Japanese Patent Application Laid Open Number 61-127732). This approach is associated with low yields of the phenylpolysilsesquioxane product and in particular is ill-suited for the preparation of low-molecular-weight phenylpolysilsesquioxane.

The present invention takes as its object the introduction of low-molecular-weight phenylpolysilsesquioxanes that have a narrow molecular weight distribution (low dispersity). A further object of the present invention is the introduction of a method for the preparation of said phenylpolysilsesquioxanes.

The present invention relates to phenylpolysilsesquioxane with the following general formula

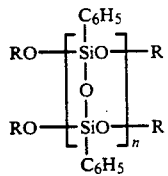

wherein each R is a hydrogen atom or monovalent hydrocarbon group, and n is a positive number and wherein at least 90% of the phenylpolysilsesquioxanes consist of a fraction with a number-average molecular weight in the range of 500 to 1,500. For purposes of this invention, the number-average molecular weight is determined by gel permeation chromatography which is calibrated with a styrene standard. The present invention also relates to a method for the preparation of said phenylpolysilsesquioxane, wherein said method comprises the formation of a two-layer system comprising (i) a layer of organic solvent that is not miscible with water in any proportion, (ii) an aqueous layer in which there is dissolved at least one lower aliphatic alcohol and at least one alkali metal carboxylate, and (iii) phenyltrihalosilane wherein the phenyltrihalosilane is hydrolyzed and condensed in this two layer system.

The phenylpolysilsesquioxanes according to the present invention are explained in greater detail in the following disclosure.

The phenylpolysilsesquioxanes according to the present invention have the general formula

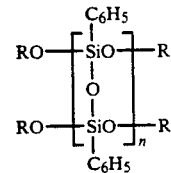

wherein at least 90% of the phenylpolysilsesquioxanes consist of a fraction with a number-average molecular weight in the range of 500 to 1,500. The group R in the preceding formula is the hydrogen atom or a monovalent hydrocarbon group, and is specifically exemplified by the hydrogen atom and by monovalent hydrocarbon groups such as methyl, ethyl, n-propyl, and isopropyl. The subscript n is a positive number that designates the average degree of polymerization, and it assumes values such that the fraction with a number-average molecular weight in the range of 500 to 1,500 comprises at least 90% of the phenylpolysilsesquioxanes. Such phenylpolysilsesquioxanes have a molecular-weight-distribution dispersity within the range of 1.0 to 1.5.

The present method for the preparation of phenylpolysilsesquioxanes is explained in detail below.

In the preparative method according to the present invention, a two-layer solution is first prepared that consists of (i) a layer of an organic solvent that is not miscible with water in any proportion (ii) an aqueous layer in which there is dissolved at least one lower aliphatic alcohol and at least one alkali metal carboxylate. The phenylpolysilsesquioxane according to the present invention is then prepared by hydrolyzing phenyltrihalosilane and condensing the hydrolyzate in this two layer system.

The lower aliphatic alcohols used in this method function as a cosolvent for both the water and organic solvent and thereby promotes migration into the organic solvent layer of the phenylpolysilsesquioxane produced in the aqueous layer. They also function to promote hydrolysis of the phenyltrihalosilane. Useable lower aliphatic alcohols are specifically exemplified by methanol, ethanol, n-propanol, isopropanol, and n-butanol. The lower alcohol is preferably used at 1 to 100 weight parts per 100 weight parts water.

The alkali metal carboxylates used in the present invention function to bind the hydrogen halide generated by phenyltrihalosilane hydrolysis. In addition, the carboxylic acids produced as a by-product in this reaction form a buffer solution in combination with the alkali metal carboxylates and thereby function to prevent the phenylpolysilsesquioxane product from reaching high molecular weights. By implementing phenyltrihalosilane hydrolysis and condensation in a buffer solution, the preparative method according to the present invention makes possible the preparation of phenylpolysilsesquioxane that have at least 90% of a fraction with a number-average molecular weight in the range of 500 to 1,500. Useable alkali metal carboxylates are specifically exemplified by sodium formate, potassium formate, lithium acetate, sodium acetate, cesium acetate, and sodium propionate. The alkali metal carboxylates should be used generally at 20 to 100 weight parts per 100 weight parts water and preferably at 40 to 60 weight parts per 100 weight parts water.

The organic solvents used by the present invention should not be miscible with water in any proportion, and are exemplified by aliphatic hydrocarbons such as hexane, heptane, octane, and nonane, and by aromatic hydrocarbons such as benzene, toluene, and xylene. The organic solvents are preferably used within the range of 50 to 300 weight parts per 100 weight parts of water based on considerations of economics and the solubilities of the phenyltrihalosilane and phenylpolysilsesquioxane product.

The phenyltrihalosilanes used in the present invention are exemplified by phenyltrifluorosilane, phenyltrichlorosilane, phenyltribromosilane, and phenyltriiodosilane. Phenyltrichlorosilane and phenyltribromosilane are preferred. The phenyltrihalosilane is preferably added at 1 to 100 weight parts per 100 weight parts of water. The techniques for phenyltrihalosilane hydrolysis are exemplified by dripping the phenyltrihalosilane into the above-described two layered system and by preliminarily dissolving the phenyltrihalosilane in organic solvent and dripping this into the above-described two layer system.

During the phenyltrihalosilane hydrolysis, the stirring rate in the system under consideration must be regulated or adjusted to a stirring rate that permits the formation of the two layers — aqueous and organic solvent. When the phenyltrihalosilane hydrolysis is run in a water/organic solvent suspension, the fraction with number-average molecular weight in the range of 500 to 1,500 will fall below 90% and the molecular-weight-distribution (dispersity) will also exceed 1.5.

The phenylpolysilsesquioxanes according to the present invention are useful as an additive for paints and coatings, as a heat-resistant, electrically insulating film, and as an intermediates for the preparation of phenylpolysilsesquioxane carrying any of various types of functional groups ("functionalized phenylpolysilsesquioxane"). Variously functionalized phenylpolysilsesquioxanes can be prepared, for example, as follows: (a) dimethylchlorosilane is condensed with the silanol groups or alkoxy groups at the molecular chain terminals of phenylpolysilsesquioxane according to the present invention to afford phenylpolysilsesquioxane carrying silicon-bonded hydrogen at the molecular chain terminals, and (b) this phenylpolysilsesquioxane is then addition-reacted with an aliphatically unsaturated compound that carries any of various functional groups. The variously functionalized phenylpolysilsesquioxanes afforded thereby are themselves useful as additives for paints and coatings and as resin modifiers.

EXAMPLES

The present invention is explained in greater detail below through illustrative, application, and comparison examples; however, the present invention is not limited by these illustrative examples. The dispersity was used as the molecular-weight-distribution descriptor.

Example 1

Water (264.1 g) was introduced into a 1 liter flask equipped with stirrer, thermometer, and addition funnel. Anhydrous sodium acetate (132.1 g, 1.61 mol) was then introduced with stirring and completely dissolved. This was followed by the introduction of 51.6 g (0.859 mol) isopropanol and 236 g toluene. While maintaining a stirring rate that permitted the formation of two layers i.e. the toluene layer and water layer, 90.8 g (0.429 mol) phenyltrichlorosilane was dripped in to the solvent over 40 minutes. After stirring for an additional 20.8 hours at 25° to 50° C., the reaction mixture was transferred to a 1 liter separatory funnel. The aqueous layer was drawn off, discarded, and the toluene layer was then washed with additional fresh water until the wash water reached neutrality. At this point, the toluene layer was transferred to a 0.5 liter flask equipped with stirrer, thermometer, and reflux condenser equipped with a water trap, and water was removed while heating under reflux for 3 hours. After filtration of the resulting toluene solution, the toluene was removed in vacuo to afford 57.8 g phenylpolysilsesquioxane.

This phenylpolysilsesquioxane had a number-average molecular weight of 700 according to gel permeation chromatography calibrated with a polystyrene standard. Its fraction with number-average molecular weight of 500 to 1,500 was 95%, its dispersivity was 1.46, and it contained 14 mole % isopropoxy groups at the molecular chain terminals.

Application Example 1

Into a 0.3 liter flask equipped with stirrer, reflux condenser, addition funnel, and thermometer were introduced 13.7 g of the phenylpolysilsesquioxane prepared in Example 1 and 82.8 g toluene with complete dissolution. This was followed by the introduction of 14 mg trifluoroacetic acid and stirring at room temperature. 1,1,3,3-tetramethyldisilazane (8.12 g) was dripped into the mixture over 30 minutes, and after the completion of the addition the reaction was stirred for 4.5 hours at room temperature to 29° C. After completion of the reaction, the reaction solution was filtered and the toluene was removed in vacuo to afford 12.7 g phenylpolysilsesquioxane having silicon-bonded hydrogen at the molecular chain terminals.

This phenylpolysilsesquioxane contained 0.14 wt % silicon-bonded hydrogen. It had a number-average molecular weight of 1,400 as measured by gel permeation chromatography calibrated with a polystyrene standard, its weight-average molecular weight was 1,700, and its fraction with number-average molecular weight=500 to 1,500 came to 92%.

Comparison Example 1

Toluene (100 g) and water (360 g) were introduced into a 1 liter flask equipped with stirrer, reflux condenser, additional funnel, and thermometer. The mixed solution of 120 g (0.567 mol) phenyltrichlorosilane and 100 g toluene was dripped in over 40 minutes, and the reaction was then stirred for 6 hours at 25° to 52° C. The reaction mixture was transferred to a 1 liter separatory funnel and washed 4 times with water until the wash water reached neutrality. The toluene layer was filtered and the toluene was removed in vacuo to afford 85.5 g phenylpolysilsesquioxane.

This phenylpolysilsesquioxane had a number-average molecular weight of 2,200 and its dispersivity was 1.79.

Thus, the selective production of low-molecular-weight phenylpolysilsesquioxane (number-average molecular weight-1,500) had not occurred. Moreover, the phenylpolysilsesquioxane prepared in Example 1 had a lower molecular weight than the phenylpolysilsesquioxane obtained in Comparison Example 1.

The phenylpolysilsesquioxanes according to the present invention are a low-molecular-weight phenylpolysilsesquioxanes with a narrow molecular weight distribution (low dispersity). The preparative method according to the present invention characteristically affords this phenylpolysilsesquioxane in good yields.

BRIEF DESCRIPTION OF THE DRAWINGS

FIG. 1 contains the $^1$H-nuclear magnetic resonance spectrogram of the phenylpolysilsesquioxane prepared in Example 1.

FIG. 2 contains the $^1$H-nuclear magnetic resonance spectrogram of the phenylpolysilsesquioxane prepared in Application Example 1.

Figure 1:
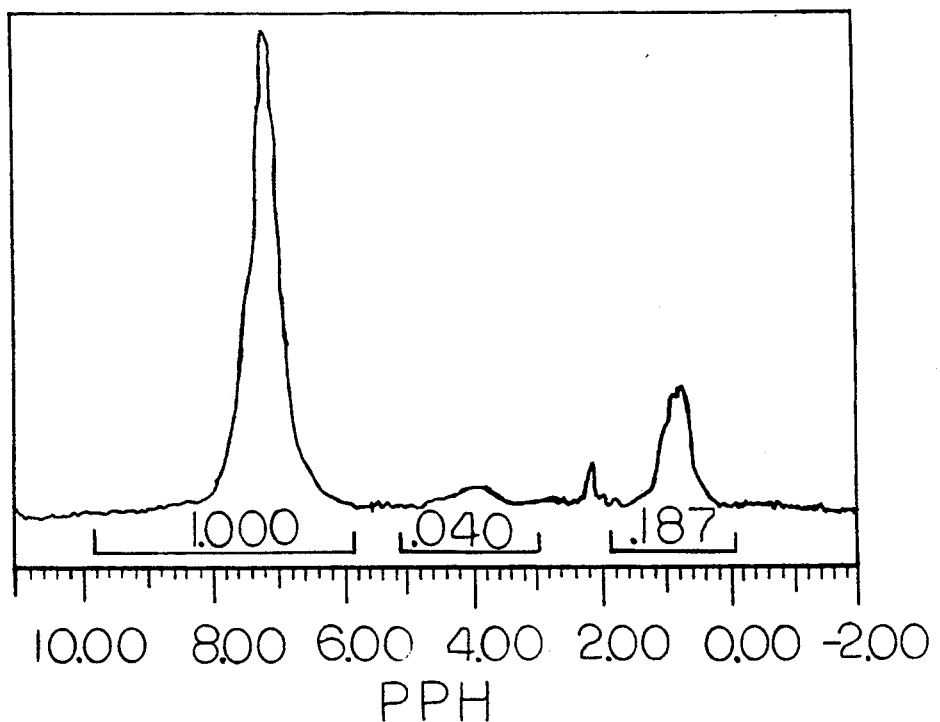
FIG. 1
Figure 2:
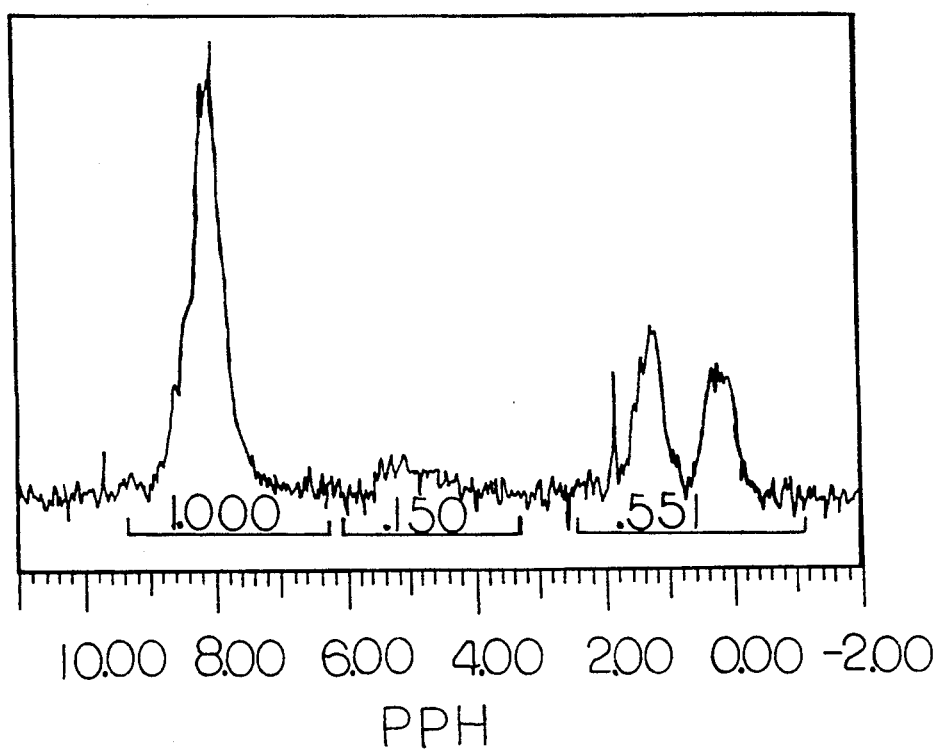
FIG. 2

That which is claimed is:

1. Method for the preparation of phenylpolysilsesquioxanes having the following general formula

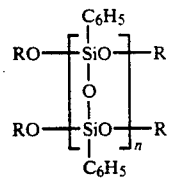

wherein each R is a hydrogen atom or monovalent hydrocarbon group, and n is a positive number
and wherein at least 90% of the phenylpolysilsesquioxanes consist of a fraction with a number-average molecular weight in the range of 500 to 1,500,
wherein said method comprises the forming a two-layer system comprising (i) a layer of organic solvent that is not miscible with water in any proportion and (ii) an aqueous layer in which there is dissolved at least one lower aliphatic alcohol and at least one alkali metal carboxylate, and (iii) adding a phenyltrihalosilane wherein the phenyltrihalosilane is hydrolyzed and condensed in this two layer system.

* * * * *